United States Patent
Ma (10) Patent No.: US 9,178,929 B2
(45) Date of Patent: Nov. 3, 2015

(54) CLIENT-SIDE CLASS-OF-SERVICE-BASED BANDWIDTH MANAGEMENT IN OVER-THE-TOP VIDEO DELIVERY

(71) Applicant: Ericsson AB, Stockholm (SE)

(72) Inventor: Kevin J. Ma, Nashua, NH (US)

(73) Assignee: ERICSSON AB, Stockholm (SE)

( * ) Notice: Subject to any disclaimer, the term of this patent is extended or adjusted under 35 U.S.C. 154(b) by 331 days.

(21) Appl. No.: 13/873,885

(22) Filed: Apr. 30, 2013

(65) Prior Publication Data

US 2014/0095729 A1  Apr. 3, 2014

Related U.S. Application Data

(60) Provisional application No. 61/640,860, filed on May 1, 2012.

(51) Int. Cl.
*G06F 15/16* (2006.01)
*H04L 29/06* (2006.01)
*H04L 29/08* (2006.01)

(52) U.S. Cl.
CPC ............ *H04L 65/608* (2013.01); *H04L 67/322* (2013.01); *H04L 67/325* (2013.01); *H04L 69/28* (2013.01)

(58) Field of Classification Search
CPC ....... H04L 65/608; H04L 65/80; H04L 69/28; H04N 11/02; H04N 7/173; H04W 28/24
USPC ............................ 709/203, 219, 231; 370/231
See application file for complete search history.

(56) References Cited

U.S. PATENT DOCUMENTS

| 8,402,156 B2 * | 3/2013 | Brueck et al. ................. 709/231 |
| 8,925,021 B2 * | 12/2014 | Ma et al. ........................ 725/90 |
| 2013/0223509 A1 * | 8/2013 | Tweedale et al. ........ 375/240.01 |
| 2014/0219088 A1 * | 8/2014 | Oyman et al. ................ 370/231 |

\* cited by examiner

*Primary Examiner* — Frantz Jean (57) ABSTRACT

A client device downloads content from a content delivery network as segments encoded at respective bitrates selected from distinct encoding bitrates. Downloading is paced per a class of service having an associated abort timeout increasing with higher classes of service. Pacing includes downloading a segment encoded at a first bitrate and monitoring for the earlier of completing the downloading or aborting the downloading based on the abort timeout. Upon the downloading being aborted, a first backoff duration is calculated as a remainder of a playback interval and the first backoff duration is waited before downloading of the same segment is re-initiated at a second bitrate less than the first bitrate. Upon the downloading completing successfully, a second backoff duration is calculated and the second backoff duration is waited before downloading is initiated of a next segment encoded at either the first bitrate or at a greater third bitrate.

24 Claims, 4 Drawing Sheets

CLIENT-SIDE CLASS-OF-SERVICE-BASED BANDWIDTH MANAGEMENT IN OVER-THE-TOP VIDEO DELIVERY

BACKGROUND

This invention relates in general to over-the-top (OTT) media delivery and more specifically to providing differentiated service to independent OTT video streaming clients.

Near-real-time delivery protocols are popular for OTT video delivery due to their simplicity, their ability to adapt to varying network conditions through the use of rate adaptation, and the low cost of deployment using commodity HTTP delivery infrastructures. OTT video delivery typically relies on content delivery networks (CDNs) optimized for large scale deployment of generic data files, via HTTP, to large numbers of clients across multiple geographic regions. Unlike the closed-circuit nature of broadcast television, which requires access to a private multiple service operator (MSO) network, using an MSO provided and provisioned client device, e.g., a leased set-top-box (STB), which relies on customized delivery and encryption protocols to maintain control over content delivery, OTT delivered content is accessible to any network connected device which supports the ubiquitous HTTP protocol. Content is made available through CDNs, though playback may be restricted using digital rights management (DRM) which may require authentication to acquire content encryption information.

Service providers and network operators rely on closed networks and operator controlled devices to be able to manage bandwidth and enforce service differentiation by explicitly controlling each client in the network. The use of commoditized CDN infrastructures, which provide free access to content by clients, inhibits the ability of service providers and network operators to control client bandwidth usage. Independent OTT client implementations tend to be greedy in nature which can prevent fair access to network resources between clients, and limits the methods available for supporting differentiated service enforcement. The ability to provide differentiated services is an important factor in the monetization of content delivery. Alternate methods are needed to efficiently enforce class of service differentiation in OTT video delivery.

SUMMARY

Client rate adaptation algorithms typically use delivery throughput estimates when selecting a bitrate to play. OTT clients typically retrieve content in segments using the HTTP protocol. HTTP-based delivery typically uses an as-fast-as-possible download paradigm. Clients estimate throughput based on the download time of the segment. The throughput $T=S/D$, where D is the download time for the segment in seconds and S is the size of the segment in bits. In networks with low throughput, clients will detect the low throughput due to its long download time D. In networks with high throughput, clients will have a much lower download time D. In high throughput networks, greedy clients will detect the availability of excess capacity and will attempt to use it. This operation may conflict with proper operation of other clients, and it does not lend itself to tiering of service to enable a service provider to increase operational revenues.

Paced delivery of content can be used to artificially increase the download time and temper the greediness of the client. Using different pacing rates for different classes of service allows for class of service-based differentiation of client bandwidth allocations.

Methods and apparatus are disclosed for enforcing class of service differentiation in over-the-top (OTT) delivery of video content using delivery pacing to control client rate adaptation. In particular, a method is provided for using abort timeouts and backoff times to implement a client rate adaptation algorithm which enforces class of service differentiation between clients without requiring explicit coordination between clients. The abort timeout is used to prevent clients from exceeding their bandwidth allocation as determined by their class of service. The abort timeout may be calculated as $A=L*P$, where L is the content segment playback duration and P is a class-of-service multiplier value between 0 and 1. The P value effectively allocates a portion of the available bandwidth to the client. The backoff time may be calculated as $B=L-\min(A, D)$, and is used to ensure that the client does not use more than its bandwidth allocation. Higher classes of service are assigned larger values of P than lower classes of service.

In one embodiment, P values are determined a priori by the content service provider and mapped explicitly to individual classes of service. The client rate adaptation algorithm is provided with the P value by the client application invoking the media player employing the rate adaptation algorithm. In one embodiment, the P value is hard coded in the client application, where subscribers within the different classes of service are provided different applications which enforce the class of service differentiation associated with their subscription level. In another embodiment, the client application looks up the class of service for the subscriber. In one embodiment, the client application presents the subscriber credentials (e.g., username and password) to a subscriber management system and retrieves the class of service level and P value for that subscriber.

In one embodiment, the client rate adaptation algorithm uses a segment based approach where the client maintains a queue of segments of length Q. Segments are added to the queue as they are downloaded and removed from the queue as they are played out. In one embodiment, bitrate up-switches are only allowed when the queue is full. The full queue implies a history of high throughput, where the segment download rate has exceeded the segment playout rate. In one embodiment, segment up-switches require that the current throughput estimate exceeds the bitrate requirement of the content representation being switched to, e.g., $T>R/L*A$, where R is the bitrate requirement. In one embodiment, bitrate down-switches occur whenever a segment download is aborted (i.e., when $D>=A$). In one embodiment, bitrate down-switches also occur when a segment queue underrun occurs.

A system is also specified for implementing a client in accordance with the provisions of the above method.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Techniques for bandwidth management in over-the-top (OTT) content delivery operations include (I) server-based techniques and (II) client-based techniques, where the server-based techniques include a subset usable by a network proxy.

The description below is divided into two distinct sections I and II for the server-based techniques and client-based techniques respectively. A network may have servers using the server-based techniques with or without clients using the client-based techniques. Alternatively, there may be clients using the client-based techniques with or without servers using the server-based techniques.

When the techniques are used together, there are two cases involving priority multipliers or class-of-service values P referred to in the description below—coordinated and non-coordinated. In coordinated operation the server knows the client P value, while in non-coordinated operation the server does not know the client P value. Theoretically there could be a technique in which the client knows the server P value, but such a technique might have limited use. Typically, servers are more powerful than clients and are directly controlled by service providers that need to manage network bandwidth. Thus, it may be most useful for a server to adapt to a client P value to achieve any desired effect.

If the server does not know the client P value, it can correlate a requested bitrate with changes in its own (server) P value. Ultimately, if the server's goal is to reduce the bitrate of the client to a target bitrate, it can adjust its P value to do so. If the server overshoots because the client has a small P value, then it can adjust its own (server) P value to raise the client's bitrate back up.

If the server does know the client P value, it can adjust its own P value to compensate, e.g., adjusted_server_P=server_P/client_P. However, this can cause the server to expend more resources on lower class-of-service (CoS) clients, which may not be desirable. It may be possible to apply a cap to the adjusted_server_P value, on a per CoS basis.

As another feature, if the server does have a target bitrate for each client, it could adjust its P value to try to accommodate the client. If the client is on a jittery network (high variability of available bandwidth), for example, the server could detect requested bitrate thrashing (rapid switching between requested bitrates) and adjust its P value to try to smooth out the bitrates being requested. If the client keeps falling below the target bitrate, the server could increase the P value slightly. If the client keeps reaching for the next higher bitrate, the server could reduce the value slightly.

Figure 1:
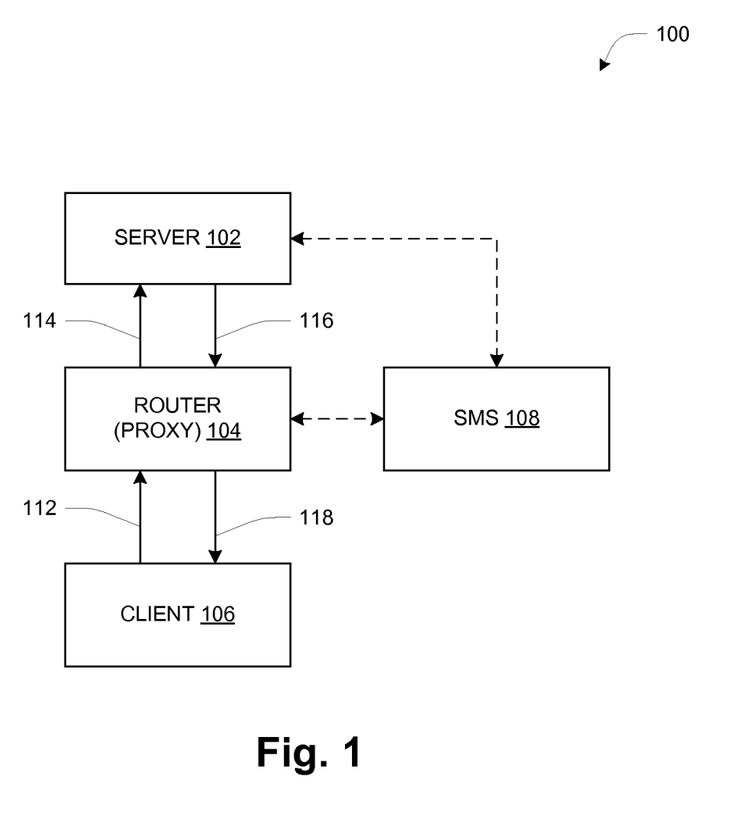
FIG. 1 is a block diagram of a system which is capable of conducting end-to-end content delivery procedures, in accordance with various embodiments of the invention.

In FIG. 1 is a block diagram 100 for one embodiment of the present invention. A client device or client 106 issues a content request 112/114 to a server 102 which responds to the content request 112/114 with a content response 116/118. The content requests 112/114 and content responses 116/118 are carried on a communications network (not shown) and may traverse one or more intermediate routers 104. In one embodiment of server-side pacing, server 102 initiates pacing on the content response 116/118. In another embodiment, the intermediate router 104 may act as a network proxy for the request 112 and apply pacing on the content response 118. In the network proxy case, the proxied request 114 and proxied response 116 may or may not be paced. If the content response 116 from the server 102 is paced, the intermediate router 104 may initiate further pacing on the content response 118 from the intermediate router 104 to the client 106. Further references to the intermediate router 104 shall refer to a network proxy 104. Also, the term "origin endpoint" is used to refer to a server device 102 as distinct from a proxy 104.

FIG. 1 also shows a subscriber management system (SMS) 108. The subscriber management system 108 may be queried to retrieve class of service information for client 106. As also described below, client-side pacing may be used either instead of or in conjunction with server-side pacing.

The devices shown in FIG. 1, including the server 102, proxy 104, and client 106, may be realized as physical computers as generally known in the art, with hardware including one or more processors, memory, and interface circuitry interconnected by data interconnections such as one or more high-speed data buses. The interface circuitry provides a hardware connection to communications networks over which the messages 112 etc. are transferred. The processor(s) with connected memory may also be referred to as "processing circuitry" herein. There may also be local storage such as a local-attached disk drive or flash drive. In operation, the memory stores data and instructions of system software (e.g., operating system) and one or more application programs which are executed by the processor(s) to cause the hardware to function in a software-defined manner. Thus the computer hardware executing instructions of a content delivery application, such as described herein, can be referred to as a content delivery circuit or content delivery component, and it will be understood that a collection of such circuits or components can all be realized and interact with each other as one or more sets of computer processing hardware executing different computer programs as generally known in the art.

I. Server-Based Bandwidth Management

As outlined above, the server 102 and/or proxy 104 employ server-side techniques for managing the use of content delivery bandwidth by client devices such as client 106. The techniques include both pacing of delivery as well as intelligent switching among different bitrates of content encoding, and these further involve a "class of service" component that divides clients into different classes for purposes of allocating use of delivery bandwidth. In one embodiment, class of service may be represented by a variable referred to herein as "P", where higher values of P correspond to higher classes of service and greater allocated bandwidth. P values are used as multipliers of delivery rates. For example, P may be in the range of 1 to 100 and effectively scale a minimal required delivery rate to a higher rate reflecting a certain class of service. Alternatively, P may be in the range of 0 to 1 and effectively scale one delivery rate to a corresponding lower delivery rate reflecting a certain class of service. In one embodiment, the server 102 may employ the up-scaling P values in the range of 1 to 100, while the proxy 104 may perform no additional scaling or may employ down-scaling P values in the range of 0 to 1. As described more below, reducing the delivery rate can cause certain client devices to automatically shift to a lower-bitrate encoding and thus reduce the client's use of delivery bandwidth.

Figure 2:
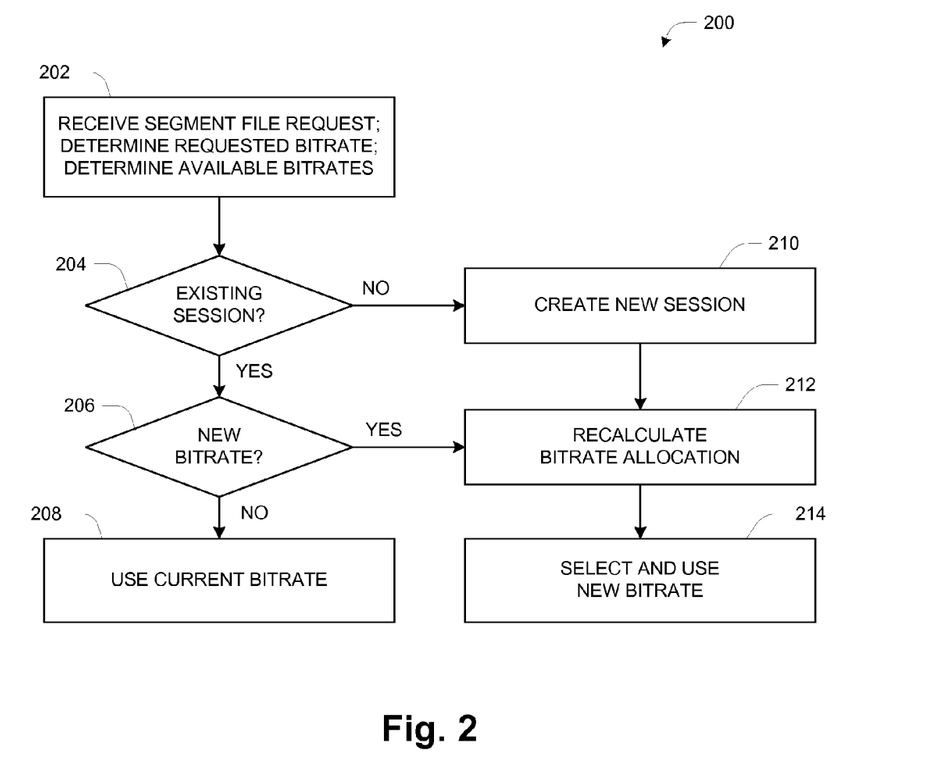
FIG. 2 is a flow chart showing a method for performing rate selection, in accordance with an embodiment of the present invention.

FIG. 2 is a flow chart 200 describing a server-side process for performing content bitrate selection with class of service differentiation enforcement. In step 202, the server 102 or network proxy 104 receives a content request for a video segment from the client 106. The server 102 or network proxy 104 parses the request to determine the bitrate of the request (i.e., which bitrate encoding from among a set of different-bitrate encodings is being requested). The server 102 or network proxy 104 also looks up the bitrates of alternate representations for the requested content before proceeding to step 204.

In step 204, the server 102 or network proxy 104 checks to see if a session already exists for the client 106 and the requested content. In one embodiment, a video streaming session is determined based on the temporal proximity of segment requests for the same content by a given client 106. A session is deemed to be active if consecutive segment requests have been received from the same client 106 within N*L, where L is the segment duration and N is the session request jitter multiplier (e.g., N=2 segments). In one embodiment, the client 106 is identified by an HTTP header (e.g., a cookie value or a proprietary header value). In another embodiment, the client 106 is identified by a query string parameter of the request URI. In another embodiment, client 106 is identified by its source IP address. In one embodiment, an opaque token provided in an HTTP header is used to identify the client 106 to the subscriber management system 108. In another embodiment, the source IP address of client 106 is used to identify client 106 to the subscriber management system 108.

At 204 the server 102 or network proxy 104 may also retrieve a class of service for client 106 from the subscriber management system 108. The class of service may be represented by a particular value of a variable identified as "P" herein, and it is used in subsequent operations as described below.

If no session exists in step 204, processing continues to step 210 where a session is created. Once a new session is created, processing continues to step 212 which is described below. If a session already exists in step 204, processing continues to step 206, where the server 102 or network proxy 104 checks to see if the client 106 is requesting a new bitrate (i.e., a bitrate different from that of preceding requests). If the bitrate has not changed, processing continues to step 208, otherwise processing continues to step 212. At 208, the server 102 or network proxy 104 continues the session at the same (current) bitrate. In step 212, if a new session was created or the client 106 is now requesting a different bitrate, the server 102 or network proxy 104 recalculates the bitrate allocation for all clients 106, and then at 214 it selects the appropriate bitrate for use in subsequent delivery to this client 106. Details of bitrate allocation are given below.

In one embodiment, if the bitrate requested at 206 by client 106 is less than a maximum bitrate allocation calculated at 212, then the bitrate requested by client 106 is selected at 214. However, if the bitrate requested by client 106 is greater than the maximum bitrate allocation calculated by the server 102 or network proxy 104, then the maximum bitrate is selected. In another embodiment, regardless of what bitrate was requested by the client 106, the maximum bitrate allocation is selected. In one embodiment, a server 102 will then begin sending the data for the content representation corresponding to the selected bitrate, in response to the content request of client 106. In another embodiment, a network proxy 104 will forward a modified content request to the server 102 requesting the selected bitrate, possibly different from the bitrate requested by client 106.

For the recalculation of bitrate allocation at 212, the server 102 or network proxy 104 may use a breadth-first algorithm such as described below. This approach is a multi-pass approach, and in each pass a given bitrate is assigned to all clients within a set of classes of service, until not all clients can be given the next higher bitrate. Clients with lower classes of service are then eliminated from further consideration, and another pass is performed for the remaining clients (of higher classes of service) to assign higher bitrates to them if possible. This process may be repeated.

The following is a pseudocode description of an example breadth-first bitrate allocation algorithm that may be used. The term "cos" refers to "class of service".

```
int max_capacity;
int num_bitrates;
int bitrates[num_bitrates];
int num_cos;
int num_clients_per_cos[num_cos];
int num_clients;
client_max_bitrate[num_clients];
client_cos[num_clients];
int usage = 0;
int cos = 0;
int bitrate = 0;
int clients = num_clients;
for (int i = 0; i < num_clients; i++) {
    client_max_bitrate[i] = bitrates[min_bitrate]
}
++bitrate;
while (cos < num_cos && bitrate < num_bitrates) {
    usage = 0;
    for (int i = 0; i < num_clients; i++) {
        usage += client_max_bitrate[i];
    }
    if (clients * (bitrates[bitrate] –
            bitrates[bitrate – 1]) > max_capacity – usage)
        clients – = num_clients_per_cos[cos];
        ++cos;
    } else {
        for (int i = 0; i < num_clients; i++) {
            if (client_cos[i] >= cos) {
                client_max_bitrate[i] = bitrates[bitrate];
            }
        }
        ++bitrate;
    }
}
```

A simplified example of the operation of the above algorithm is provided. The result in this example is the division of the total available bandwidth among clients 106 in three classes of service. In a first pass all clients are assigned a first bitrate (BR) X. At that point enough overall bandwidth has been allocated that not all clients can be given the next bitrate, which is 2× in this example, however, there is enough excess bandwidth to increase the bitrate of some clients. Thus the clients of Group I having classes of service (COS) below a first threshold A are removed from further consideration, and these retain the BR allocation of X. When this process is repeated for the remaining clients, it results in a second group, Group II, having COS between A and a second higher threshold B, being allocated the next higher bitrate 2×. The remaining clients having COS greater than B form Group III and are allocated the next higher bitrate 3×. It will be appreciated that the density of clients diminishes in successively higher groups, because each client is using more bandwidth than each client in a lower class. As a simple example, imagine that there are 20 units of bandwidth available. These might be distributed among 16 clients as follows:

Group I 13 clients with COS<A; 13 units allocated (13×1)
Group II 2 clients with A<COS<B; 4 units allocated (2×2)

Group III 1 client with B<COS; 3 units total (1×3)

Though the example shows bitrate allocation as a linear multiple, it will be appreciated that the actual intervals between grouping thresholds are likely to be irregular and correspond to the encoded bitrates of the content being delivered.

Figure 3:
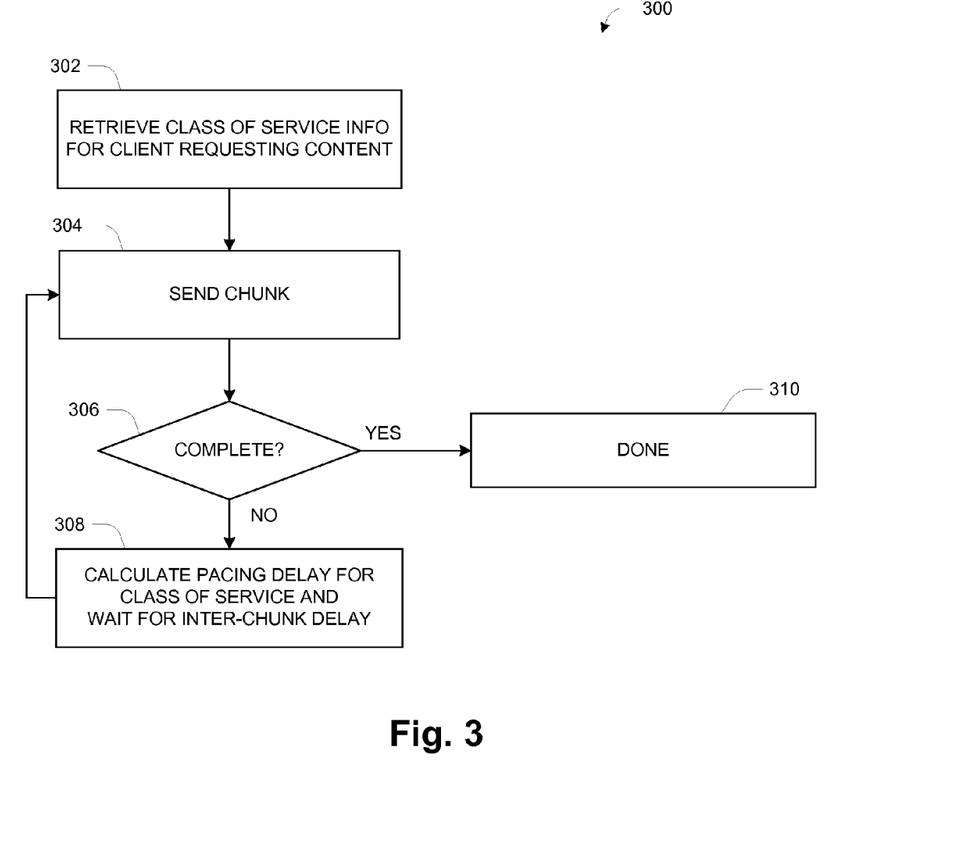
FIG. 3 is a flow chart showing a server-based method for performing paced delivery, in accordance with an embodiment of the present invention.

FIG. 3 is a flow chart 300 describing a server-side process for performing content delivery pacing with class of service differentiation enforcement. Generally, delivery is done in a "chunked" manner, i.e., dividing each content segment into smaller units called "chunks" that are individually delivered as a unit but with temporal spacing between successive chunks to attain a desired overall delivery rate. One known mechanism for chunked delivery employs the HTTP protocol.

In step 302, the server 102 or network proxy 104 retrieves the class of service parameters for the client 106. In one embodiment, a server 102 retrieves a decimal pacing rate multiplier in the range 1 to 100. In another embodiment, a network proxy 104 retrieves a decimal pacing rate multiplier in the range 0 to 1. In one embodiment, the client 106 is identified by an HTTP header (e.g., a cookie value or a proprietary header value). In another embodiment, the client 106 is identified by a query string parameter of the request URI. In another embodiment, client 106 is identified by its source IP address. In one embodiment, the class of service multiplier is retrieved from a subscriber management system 108. In one embodiment, an opaque token provided in an HTTP header is used to identify the client 106 to the subscriber management system 108. In another embodiment, the source IP address of client 106 is used to identify client 106 to the subscriber management system 108. Once the pacing multiplier has been retrieved, processing continues to step 304.

In step 304, the server 102 or network proxy 104 sends a chunk of data to client 106. In one embodiment, the chunk size C is selected to be smaller than a value known as the TCP window size, a standard parameter in the Transmission Control Protocol (TCP) for limiting the number of unacknowledged messages outstanding at a time. Limiting C in this manner enables the technique to have a desired effect on clients 106 that use TCP-based bandwidth estimation. If chunks larger than the TCP window size are used with clients 106 that make TCP-based bandwidth estimates, it may trigger estimation of burst throughput rather than an aggregate segment delivery throughput. In one embodiment, the chunk size C is set to the TCP Maximum Segment Size (MSS) of the network.

Processing then continues to step 306 where the server 102 or network proxy 104 checks to see if the segment has been completely sent. If the segment is complete, processing continues to step 310 where processing for this segment ends. If the segment delivery is not yet complete, processing continues to step 308 where the server 102 or network proxy 104 calculates the pacing delay or inter-chunk delay required to attain a target delivery rate (details are provided below) and waits the inter-chunk delay period before continuing back to step 304 where the next chunk of data is sent to client 106.

Step 308 employs a target pacing rate which is equal to (B*P), where B is the encoded bitrate of the content and P is the class-of-service multiplier. It will be appreciated that P=1 corresponds exactly to the encoded rate B, which is the minimum required for playback, while higher values correspond to delivery rates higher than the encoded rate. A client 106 may desire higher delivery rate for a number of reasons, including for example to maintain fullness of a receive buffer and thereby provide high-fidelity playback even in networks experiencing considerable variability in delivery times.

Given a chunk of size C, the target send time of the chunk (i.e., the amount of time required to send the chunk) is C/(B*P). The actual send time of the chunk is denoted Q.

The calculation at 308 is then as follows:

$$\text{Pacing delay} = \max(0, C/(B*P) - Q)$$

This can be understood by considering two cases. If it takes longer than the target time to send a chunk, then no additional delay should occur and the next chunk should be sent immediately. In this case, the value C/(B*P)−Q is less than 0, so max(0, C/(B*P)−Q) is equal to 0 and a pacing delay of 0 is used (i.e., no waiting before sending next chunk). If a chunk is sent faster than the target time, then the balance of the target time should be waited before sending another chunk. In this case, the value C/(B*P)−Q is greater than 0, so max(0, C/(B*P)−Q) provides the non-zero balance of the target time to be used as the pacing delay.

It will be appreciated that the above process has different results and effects with clients of different classes of service. As P increases, the target send time and pacing rate decrease accordingly. Generally the inter-chunk delay will be smaller, and may more often be 0 for given network circumstances. Thus, high-COS clients 106 will experience high download bandwidth. For smaller P, target send time lengthens as does the inter-chunk delay period. Thus, low-COS clients 106 experience low download bandwidth and longer inter-chunk dwell periods. This technique alone helps to achieve a desired COS-based allocation of bandwidth, and it can also affect client behavior in a manner that provides a separate bandwidth adjustment mechanism, as described more below.

II. Client-Based Bandwidth Management

Figure 4:
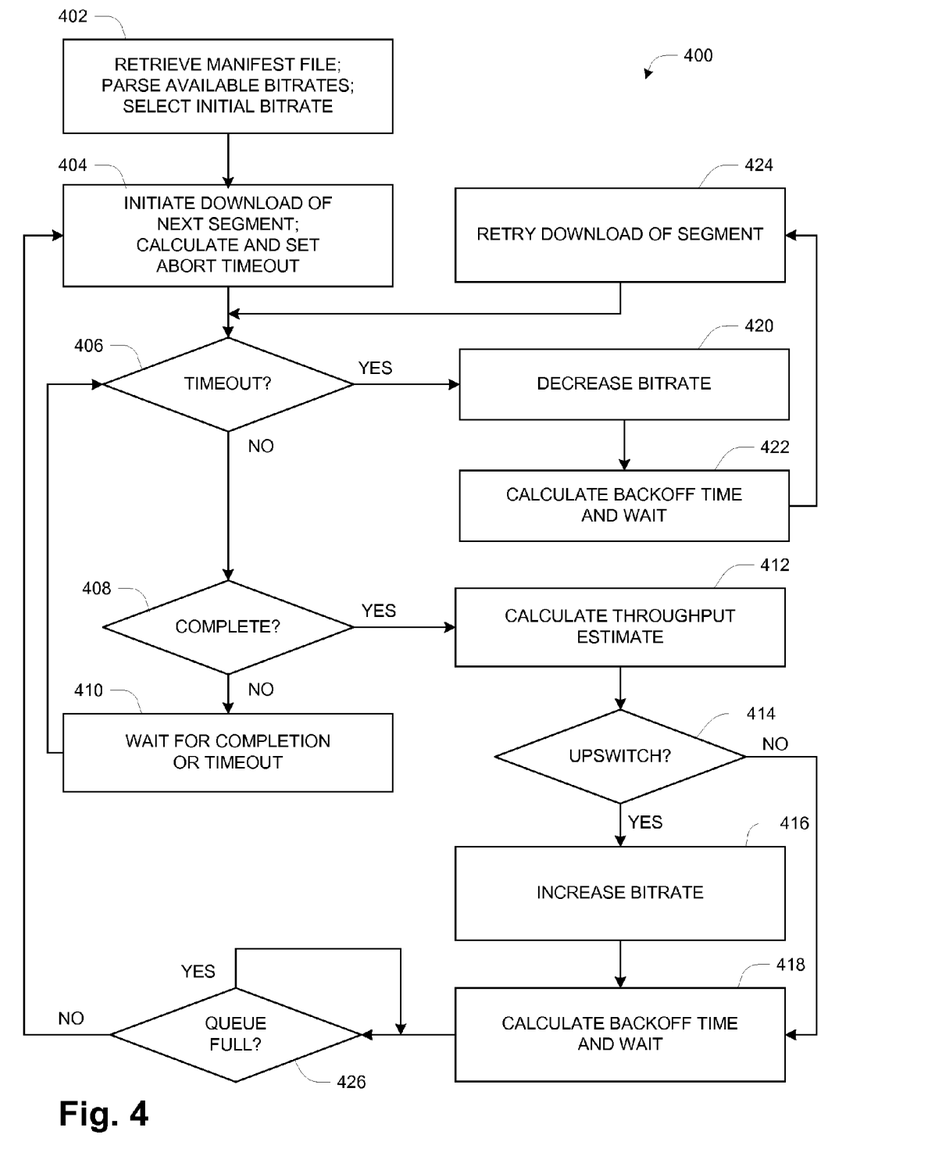
FIG. 4 is a flow chart showing a client-based method for performing rate adaptation, in accordance with an embodiment of the present invention.

FIG. 4 is a flow chart 400 describing a client-based process for performing rate adaptation with class of service differentiation enforcement. Overall, a client 106 uses an abort mechanism to selectively decrease the encoded bitrate of content being requested, along with bandwidth or throughput estimates to selectively increase bitrate. Calculations include a class-of-service component so that clients of different classes automatically arrive at desired different content delivery rates.

In step 402, the client 106 issues a request to server 102 for a manifest file. The client 106 parses the manifest file to determine the available bitrates, and then selects an initial bitrate. In one embodiment, the client 106 selects an initial bitrate based on network connectivity (e.g., high bitrate for WiFi or low bitrate for 3G/4G cellular). In another embodiment, the client 106 always selects a low bitrate to minimize initial playback latency. Processing continues to step 404 where the client 106 issues a request to server 102 for a content segment. The client 106 also calculates an abort timeout based on the class of service of the subscriber. In one embodiment, the abort timeout A=L*P, where L is the content segment playback duration and P is a fixed decimal multiplier value between 0 and 1 representing the class of service. In one embodiment, the P value is hard coded in the client application, where subscribers within the different classes of service are provided different applications which enforce the class of service differentiation associated with their subscription level. In another embodiment, the client application looks up the class of service for the subscriber. In one embodiment, the client application presents credentials of the subscriber (e.g., username and password) to the subscriber management system 108 (FIG. 1) and retrieves the class of service level and P value for that subscriber.

Processing continues to step 406 where an abort timeout check is performed. If the abort timeout has occurred, processing proceeds to step 420, otherwise processing continues to step 408 where a completion check is performed. If the segment retrieval is complete, processing proceeds to step 412, otherwise processing continues to step 410 where completion and abort checks continue by returning to step 406. Though steps 406-410 are shown as a serialized process which essentially polls the segment request connection status to determine if the connection has completed, or if a timeout has occurred, the detection of completion or timeout may be performed asynchronously, such as using callback methods, as should be understood by those skilled in the art.

In step 420, when an abort timeout has occurred the client 106 selects a lower bitrate to use for subsequent segment requests, if a lower bitrate exists. In one embodiment, the client 106 selects the next lower bitrate, relative to the current bitrate for which the content request failed. In another embodiment, the client 106 selects the lowest bitrate available. In another embodiment, the client 106 selects the highest available bitrate that is lower than the estimated throughput of the aborted download. In one embodiment, the estimated throughput is calculated as $E=X/A$, where X is the number of bits downloaded when the abort timeout occurred. Processing then proceeds to step 422 where a backoff time is calculated. In one embodiment, a backoff time $B=L-A$ is used to ensure that the client does not use more than its fixed percentage bandwidth allocation. The client 106 waits in step 422 for B seconds and then proceeds to step 424 where it retries the content request, but at the lower bitrate.

In step 412, when the segment retrieval completes successfully the client 106 estimates the throughput for the retrieval. In one embodiment, the estimated throughput is calculated as $T=S/D$. Processing then proceeds to step 414 where the estimated throughput is used to determine if a bitrate up-switch is warranted. In one embodiment, bitrate up-switches are only allowed when a segment queue used by the client 106 to temporarily store downloaded segments is full. In one embodiment, segment up-switches require that the current throughput estimate exceeds the bitrate requirement of the content representation being switched to, e.g., $T>R/L*A$.

If a bitrate up-switch is not warranted, processing continues to step 418, and otherwise processing continues to step 416 where a new bitrate is selected, before continuing to step 418. In one embodiment, at 416 the client 106 selects the next higher bitrate, relative to the current bitrate for which the content request which just completed. In another embodiment, the client 106 selects the highest available bitrate that is lower than the estimated throughput of the content request which just completed. In another embodiment, the client 106 selects the highest available bitrate that is lower than the estimated throughput of the last N consecutive content requests which have completed successfully.

In step 418, the backoff time is calculated. In one embodiment, the backoff time $B=L-D$ is used to ensure that the client does not use more than its fixed percentage bandwidth allocation. In another embodiment, the backoff time $B=\max(0, L*P-D)$ is used to enable a more aggressive retrieval of segments by the client 106, when successful download occur. The client 106 waits in step 418 for B seconds and then proceeds to step 426 where it checks the queue (segment queue) of temporarily downloaded segments. If the queue is full, processing returns back to step 426 until such time as a segment has drained from the queue. The queue may fill because the player has been paused and the rendering of segment data has been temporarily suspended, or because aggressive download has allowed the queue to fill faster than the normal playout rate of the already downloaded content. Once the queue is no longer full, processing proceeds back to step 404 where the client 106 issues a content request for the next segment. Although the queue checking in step 426 is shown as a serialized process which essentially polls the queue size to determine when a segment has drained, the detection of queue drain may be performed asynchronously, such as using callback methods, as should be understood by those skilled in the art.

In the process of FIG. 4, bitrate down-switches occur when a download is aborted as described above with reference to steps 406 and 420-424. In one embodiment, a bitrate down-switch may also occur when a segment queue underrun occurs, i.e., when a next segment is required for playback but that segment has not yet been downloaded.

When each of a set of clients 106 employs the process of FIG. 4, operation will automatically adjust to an appropriate COS-based allocation of bandwidth among the clients. High-COS clients will employ longer abort timeouts and therefore experience little or no aborting of requests. At the same time, they will be more likely to avail themselves of upswitch opportunities. Lower-COS clients will experience the opposite—greater likelihood of aborting due to shorter abort timeouts, and fewer opportunities for upswitching. Additionally, as mentioned above a proxy 104 can lengthen pacing delay to induce a downswitch in clients having sufficiently short abort timeouts.

While various embodiments of the invention have been particularly shown and described, it will be understood by those skilled in the art that various changes in form and details may be made therein without departing from the spirit and scope of the invention as defined by the appended claims.

What is claimed is:

1. A method by which a client device retrieves content from a content delivery network, comprising:
    downloading the content as a series of segments encoded at respective bitrates, the bitrates selected from a set of distinct bitrates at which the content is encoded for downloading from the content delivery network; and
    pacing the downloading in accordance with a class of service for the client device, the class of service having an associated abort timeout increasing with higher classes of service, the pacing including:
        downloading a segment encoded at a first bitrate and monitoring for the earlier of completing the downloading or aborting the downloading based on the abort timeout;
        upon the downloading being aborted, calculating a first backoff duration as a remainder of a playback interval and waiting the first backoff duration before re-initiating download of the same segment encoded at a second bitrate less than the first bitrate; and
        upon the downloading completing, calculating a second backoff duration and waiting the second backoff duration before initiating download of a next segment encoded at either the first bitrate or at a third bitrate greater than the first bitrate.

2. A method according to claim 1, wherein the abort timeout is calculated as the product of a segment playback duration and a fractional class-of-service value indicating the class of service of the client device.

3. A method according to claim 2, wherein the fractional class-of-service value is in a range between 0 and 1.

4. A method according to claim 1, further including, upon the downloading completing, determining whether an upswitch in bitrate is permissible for the client device, and only if so then selecting the third bitrate for downloading the next segment.

5. A method according to claim 4, wherein determining whether an upswitch in bitrate is permissible includes:

estimating actual throughput used to download the segment; and determining whether the actual throughput is equal to or greater than the third bitrate.

6. A method according to claim 1, wherein the first backoff duration is a remainder of a content playback duration beyond the abort timeout, and the second backoff duration is a remainder of the content playback duration beyond an actual download time during which the segment was completely downloaded.

7. A method according to claim 1, wherein the third bitrate is a next successively higher bitrate in the set of distinct bitrates at which the content is encoded.

8. A method according to claim 1, wherein the third bitrate is selected based in part on satisfaction of other requirements for increasing the bitrate.

9. A method according to claim 8, wherein the other requirements include a requirement that a segment queue used by the client device to temporarily buffer downloaded segments is full.

10. A method according to claim 1, wherein the second bitrate is a next successively lower bitrate in the set of distinct bitrates at which the content is encoded.

11. A method according to claim 1, further including:

maintaining a segment queue to temporarily buffer downloaded segments before their playback; and upon the segment queue underrunning, selecting a fourth bitrate less than the first bitrate for use downloading the next segment.

12. A method according to claim 11, wherein the fourth bitrate is a lowest bitrate in the set of distinct bitrates at which the content is encoded.

13. A method according to claim 1, further including:

determining the class of service of a current user of the client device; and issuing a content request to initiate the downloading of the content.

14. A method according to claim 1, wherein the first, second and third bitrates correspond to distinct downloadable representations of the content selected from different encoding bitrates, frame rates, resolutions, codecs, and container formats.

15. A method according to claim 1, wherein the class of service of the client device is specified explicitly by a user of the client device.

16. A method according to claim 1, wherein the class of service of the client device is determined by looking up the class of service in a subscriber management system.

17. A method according to claim 16, further including determining subscriber information based on a subscriber identifier specified explicitly by the user.

18. A method according to claim 16, further including determining the subscriber information based on a subscriber identifier gleaned from device identifier information uniquely identifying the client device.

19. A method according to claim 1, wherein the abort timeout is selected based on class of service restrictions.

20. A method according to claim 19, wherein higher classes of service are assigned longer abort timeout values than lower classes of service, effectively allocating a larger proportion of network capacity to higher classes of service.

21. A method according to claim 1, wherein the first backoff time and/or the second backoff time are selected based on class of service restrictions.

22. A method according to claim 21, wherein lower classes of service are assigned shorter backoff time values than higher classes of service, effectively allocating a smaller proportion of network capacity to lower classes of service.

23. A client device, comprising:

one or more processors;

memory;

input/output circuitry coupling the client device to a server device; and one or more high-speed data busses connecting the processors, memory and input/output circuitry together, the memory storing a set of computer program instructions executable by the processors to cause the client device to perform a method of retrieving content from a content delivery network, the method including:

downloading the content as a series of segments encoded at respective bitrates, the bitrates selected from a set of distinct bitrates at which the content is encoded for downloading from the content delivery network; and pacing the downloading in accordance with a class of service for the client device, the class of service having an associated abort timeout increasing with higher classes of service, the pacing including:

downloading a segment encoded at a first bitrate and monitoring for the earlier of completing the downloading or aborting the downloading based on the abort timeout;

upon the downloading being aborted, calculating a first backoff duration as a remainder of a playback interval and waiting the first backoff duration before re-initiating download of the same segment encoded at a second bitrate less than the first bitrate; and upon the downloading completing, calculating a second backoff duration and waiting the second backoff duration before initiating download of a next segment encoded at either the first bitrate or at a third bitrate greater than the first bitrate.

24. A non-transitory computer-readable medium storing computer program instructions, the instructions being executable by a client device to cause the client device to perform a method of retrieving content from a content delivery network, the method including:

downloading the content as a series of segments encoded at respective bitrates, the bitrates selected from a set of distinct bitrates at which the content is encoded for downloading from the content delivery network; and pacing the downloading in accordance with a class of service for the client device, the class of service having an associated abort timeout increasing with higher classes of service, the pacing including:

downloading a segment encoded at a first bitrate and monitoring for the earlier of completing the downloading or aborting the downloading based on the abort timeout;

upon the downloading being aborted, calculating a first backoff duration as a remainder of a playback interval and waiting the first backoff duration before re-initiating download of the same segment encoded at a second bitrate less than the first bitrate; and upon the downloading completing, calculating a second backoff duration and waiting the second backoff duration before initiating download of a next segment encoded at either the first bitrate or at a third bitrate greater than the first bitrate.

* * * * *